(No Model.) 2 Sheets—Sheet 1.

G. W. VON SIEMENS.
CLOSED CONDUIT FOR ELECTRIC RAILWAYS.

No. 493,948. Patented Mar. 21, 1893.

WITNESSES

INVENTOR
Georg Wilhelm von Siemens
BY
ATTORNEY (No Model.) 2 Sheets—Sheet 2.

G. W. VON SIEMENS.
CLOSED CONDUIT FOR ELECTRIC RAILWAYS.

No. 493,948. Patented Mar. 21, 1893.

WITNESSES
INVENTOR
ATTORNEY

UNITED STATES PATENT OFFICE.

GEORG WILHELM VON SIEMENS, OF BERLIN, GERMANY, ASSIGNOR TO SIEMENS & HALSKE, OF SAME PLACE.

CLOSED CONDUIT FOR ELECTRIC RAILWAYS.

SPECIFICATION forming part of Letters Patent No. 493,948, dated March 21, 1893.

Application filed June 24, 1892. Serial No. 437,322. (No model.)

*To all whom it may concern:*

Be it known that I, GEORG WILHELM VON SIEMENS, a subject of the King of Prussia, residing at the city of Berlin, Prussia, Germany, have invented certain new and useful Improvements in Supplying Current to Electrically-Operated Vehicles, such as Tramways, Railways, &c.; and I do hereby declare the following to be a full, clear, and exact description of the invention, such as will enable others skilled in the art to which it appertains to make and use the same.

This invention relates to means for supplying the electro-motive current to moving railway cars through an insulated conductor removed from the trackway, or otherwise situated, in a manner such as to promote perfect insulation of such main conductor: but my invention more particularly relates to electrical distributing devices for railways, such as described in my separate patent applications, Serial No. 428,970, filed April 13, 1892, and Serial No. 420,222, filed February 3, 1892.

The invention in the present case consists in the construction and arrangement of parts for successively shunting the main circuit into a series of sectional conductors from each of which the current is taken up by the car,— such parts being operated by a system of electro-magnets, or permanent magnets, as the case may be, all the poles of which have a constant polarity.

In order to enable others skilled in the art to which my invention appertains to understand and use the same, I will proceed to describe one suitable form of apparatus embodying the said invention, explain its operation, and subsequently point out in the appended claims its novel characteristics.

Figure 1:
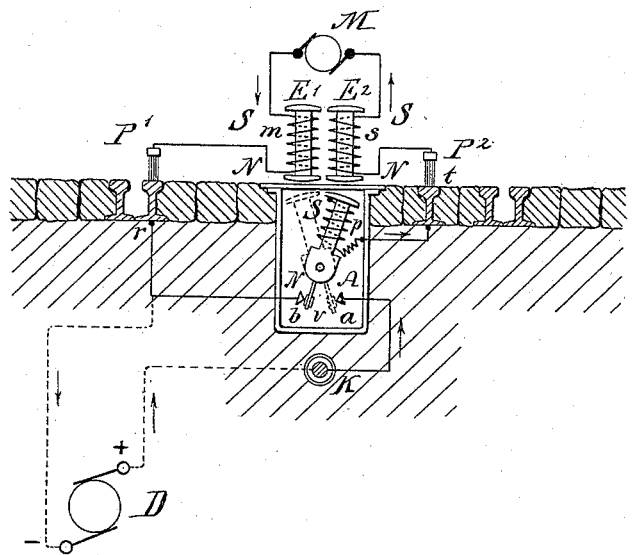
Figure 2:
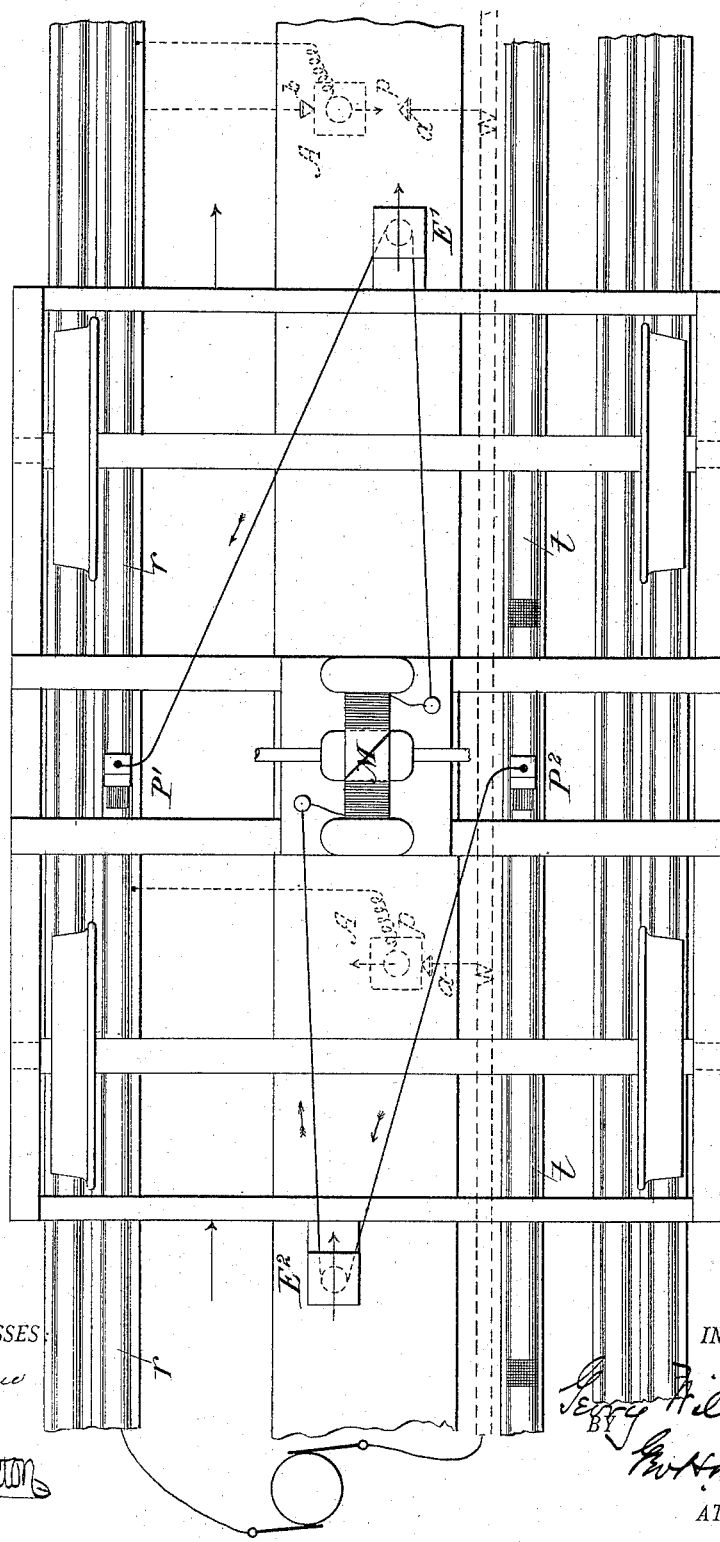

Referring to the accompanying drawings, in which similar letters of reference indicate like parts in each view: Figure 1 is a transverse section of a railway embodying my invention, indicating the electrical apparatus on the car diagrammatically; and Fig. 2 is a plan view showing, on a reduced scale, the relative arrangement of the parts indicated in Fig. 1.

K, represents the main or continuous insulated conductor removed from the track-way and connected to one pole of a dynamo-electric machine D, or other source of energy.

$t$ $t$ are sections composing a conductor which is located in the track-way, or otherwise placed; and $r$ represents the return current conductor, which in the illustration is embodied in one of the main rails of the track, and connected metallically or through the ground with the opposite pole of the dynamo-electric machine, or other source of electric energy.

M, diagrammatically represents any suitable electro motor located upon a movable vehicle, and P' P² the traveling contact making devices carried by the vehicle and connected to the respective poles of the electro motor M; the device P' bearing on one of the main rails of the track, while the device P² travels in contact with the sectional conductor $t$. The traveling contact making devices P' P² are shown as located underneath about the middle of the moving vehicle; they may be otherwise disposed.

Located at opposite ends of the vehicle, and occupying different longitudinal planes, are electro magnets E' E², which are included in the magnetizing coils $m$ $s$ of the circuit of the electro motor M. These magnets are so wound that their lower ends will represent the same sign or poles.

In Fig. 1 of the drawings, the two magnets E' E² are both shown to be north poles at the bottom, and south poles at the top.

Within a subway N, beneath the roadway, are situated at intervals magnetically controlled contact devices A, corresponding in number to the conductor section $t$, and in each is located an electro magnet $p$, which will be energized when the coil thereon is included in the circuit between the dynamo, conductor K, sections $t$, motor M, and return conductor $r$. The magnet $p$ is oscillatory upon a horizontal axis, so that it can have a movement transverse, or substantially so, to the length of the roadway. From the lower extremity of said magnet $p$ a switch arm $v$ depends and operates to bear against terminal contacts $b$ $a$ alternately. The contact $a$ is electrically connected through the conductor K, to the source of electric energy, and the contact $b$ with the return current conductor $r$. The magnet $p$ itself forms a conductor, and at its upper extremity one end of its magnetizing coil is connected, the other end being extensibly connected through a conductor leading to its section $t$. The coil of the magnet $p$ of each section is so wound that the upper end of the magnet will always present a polarity opposite to that of the opposing poles of the magnet $E'$ $E^2$ carried by the motor M. In the present case the upper end of the magnet $p$ is a south pole.

The operation of my improved device is as follows:—The normal position of the electro magnet $p$ of the device A, is shown in full lines in Fig. 1 of the drawings. When the electro magnet $E'$ on the front end of the vehicle enters a section and comes opposite the magnet $p$, it attracts the magnet $p$ and causes it to move transversely into the longitudinal plane occupied by the magnet $E'$, and to close the circuit from the source of energy to the conductors of the section. As the vehicle moves from the section the magnet $E^2$ is finally brought opposite the magnet $p$ and attracts the magnet $p$ and causes it to move transversely in an opposite direction from its first movement and into the longitudinal plane occupied by the magnet $E^2$, thereby breaking the circuit of the section with the source of energy.

In practice, the sections $t$ are given such a length, or the contacts are so arranged, that about the time the magnet $E'$ acts to cut the forward section, into which the vehicle is moving, into circuit, the magnet $E^2$ cuts the section, from which the vehicle is moving, out of circuit. It will be obvious that this is possible by reason of the fact that the brushes which collect the current are located approximately midway between the two electro magnets $E'$ and $E^2$; the result being that the brushes enter the new section before the current is cut out of the section just passed, and consequently the electro motor is never out of circuit with the source of energy, unless put out of circuit by apparatus on the vehicle for the purpose of stopping, &c. By reversing the movement of the vehicle the operation would be repeated in a reverse direction. The apparatus A, connected to the sectional conductors $t$, it will thus be seen, are arranged so that they will always be actuated by the approach of either electro magnet $E'$ or $E^2$, and therefore successively connect the sectional conductors $t$ with the source of electric energy, and again break the connection established. The magnets $p$ are suspended in such a manner that, upon the approach of the magnets $E'$ or $E^2$, they are moved through an arc, during which motion they pass through a state of unstable equilibrium, from which they gravitate either to their normal or to their working position. In Fig. 1, the normal position of the magnet $p$ is indicated by full lines, and its working position by dotted lines. By this construction the magnet $p$ is prevented from remaining in a position which would permit a cross-circuit to be established, for instance, by a vehicle communicating between the sectional conductors $t$ and return conductor $r$.

I wish it understood that I do not limit myself to the specific construction described, and shown in the drawings, as many changes may be made therein without departing from the intent of my invention.

What I claim, and desire to secure by Letters Patent, is—

1. In an electric railway system, the combination with the track or way and the successive conductor sections insulated from each other, of a permanently located magnetic switch for each section, adapted to cut the same into and out of circuit with the source of energy, a vehicle carrying magnets of the same polarity at its opposite ends but located in different longitudinal planes, and of opposite polarity to the magnet of the switch device, and contact making devices carried by the vehicle.

2. In an electric railway system, the combination with a track or way and the successive conductor sections insulated from each other, of a permanently located electro-magnetic switch for each section to successively cut the same into and out of circuit, a vehicle carrying electro-magnets located in different longitudinal planes, the coils of which are successively in series with those of the electro-magnetic switch devices, and contact making devices carried by the vehicle.

3. In an electric railway system, the combination of a distributing conductor, a series of permanently located switch devices, a series of conductor sections insulated from each other, each section permanently connected to one switch device, a return conductor, a moving vehicle having an electro-motor mounted thereon, and two magnets carried on the opposite ends of said vehicle in different longitudinal planes, and contact making devices carried by said vehicle.

4. In a system of electrical distribution for railways, the combination of a distributing conductor including a series of successive conductor sections insulated from each other, a series of switches having magnets which when energized will always have the same polarity oscillating from one gravital position to another about an axis and in planes substantially perpendicular to the length of the road, electrical connections between the distributing conductor and the sectional conductor controlled by said oscillatory magnets, a vehicle carrying two electro-magnets located at the ends of the vehicle but in different longitudinal planes, and opposite in polarity to that of the oscillating magnets, and contact making devices carried by said vehicle.

In testimony whereof I have affixed my signature in presence of two witnesses.

GEORG WILHELM VON SIEMENS.

Witnesses:
W. HAUPT,
MAX WAGNER.